United States Patent [19]

Fouassier

[11] Patent Number: 4,796,849
[45] Date of Patent: Jan. 10, 1989

[54] ANTI-VIBRATION MOUNTING DEVICE FOR A COMPACT DISK PLAYER

[75] Inventor: Jean P. Fouassier, Cachan, France

[73] Assignee: Armodel S.A., Fontenay aux Roses, France

[21] Appl. No.: 111,275

[22] Filed: Oct. 22, 1987

[30] Foreign Application Priority Data

Jan. 7, 1987 [FR] France ................. 87 00085

[51] Int. Cl.$^4$ ............................................. F16M 13/00
[52] U.S. Cl. ................................. 248/619; 248/621; 248/638; 267/136
[58] Field of Search ............. 248/619, 618, 620, 621, 248/638, 122, 149, 220.2, 221.3, 222.2, 510; 267/174, 136

[56] References Cited

U.S. PATENT DOCUMENTS

| | | | |
|---|---|---|---|
| 3,130,964 | 4/1964 | Johnson | 248/621 X |
| 3,906,689 | 9/1975 | Nakayama | 267/136 X |
| 4,251,045 | 2/1981 | Meyerle | 248/619 |
| 4,455,692 | 6/1984 | Hegge et al. | 248/221.3 X |
| 4,489,991 | 12/1984 | Delam | 248/638 X |
| 4,493,471 | 1/1985 | McInnis | 248/619 X |

OTHER PUBLICATIONS

IBM Technical Disclosure Bulletin, vol. 21, No. 12, May 1979, pp. 4959 & 4960.

Primary Examiner—Ramon O. Ramirez
Attorney, Agent, or Firm—Bacon & Thomas

[57] ABSTRACT

An anti-vibration device for attaching a compact disk player to an automobile is disclosed whereby the player is positively retained in place and is not subjected to the shocks and vibrations of the vehicle during its normal operation. The device has a generally planar base, a support plate defining a supporting surface for the compact disk player, a clamp to clamp the compact disk player to the support plate and an anti-vibration layer to attach the support plate to the base. The anti-vibration layer has a layer of foam material, which may be a polyurethane foam, and one or more compression coil springs. The use of the foam material serves to dissipate the resonances of the compression spring and provides an effective connection between the support plate and the base. The foam and the coil springs are arranged in such a way that the support plate may move freely with respect to the base.

28 Claims, 3 Drawing Sheets

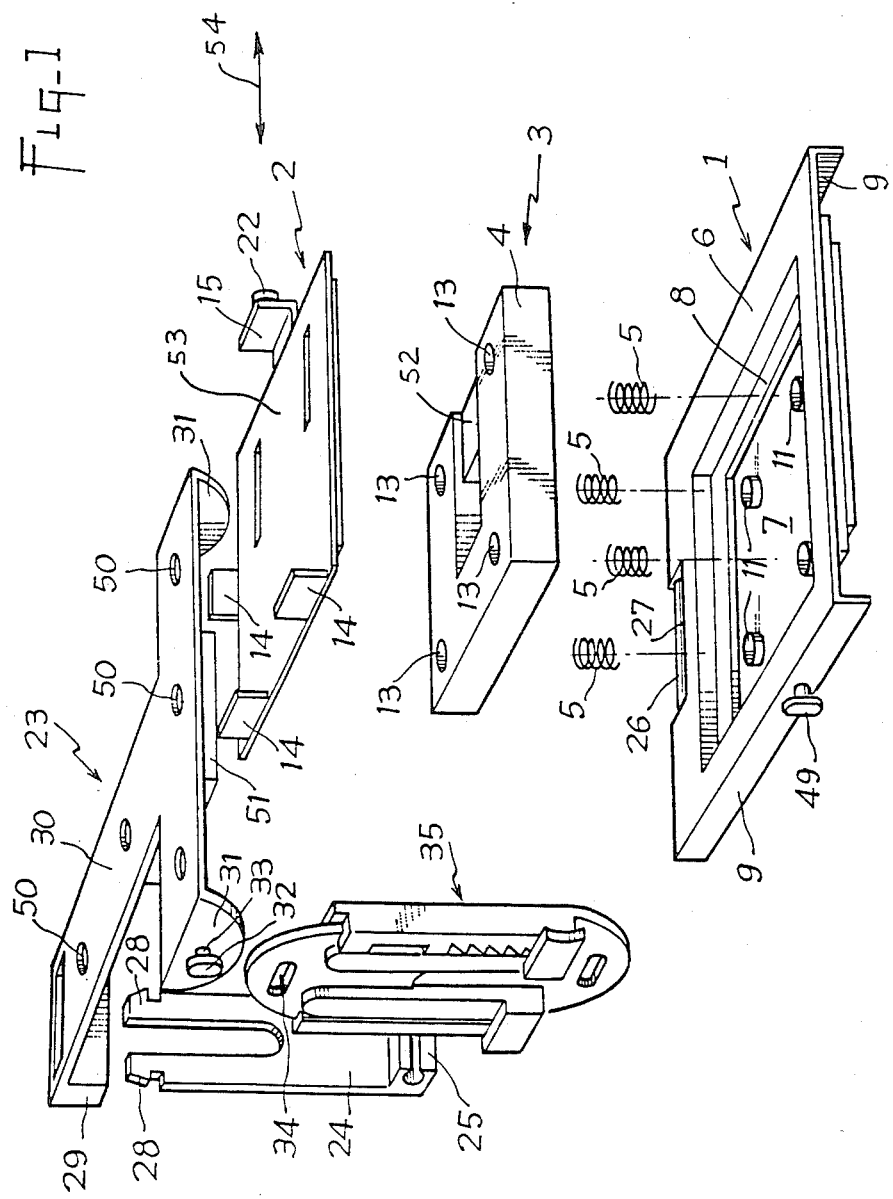

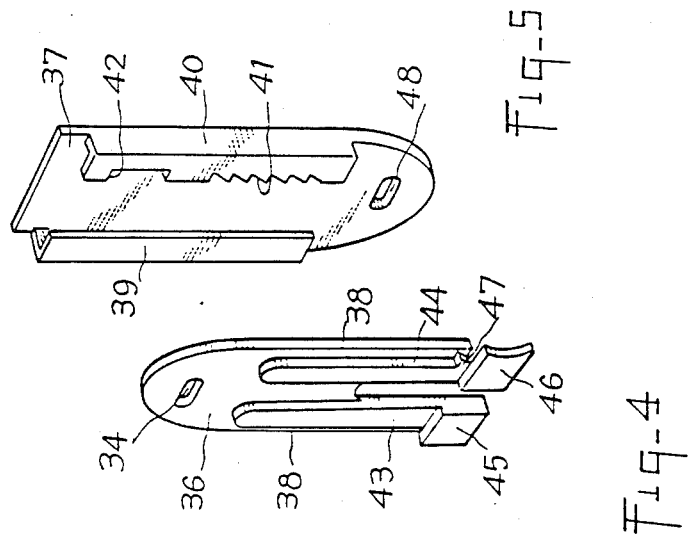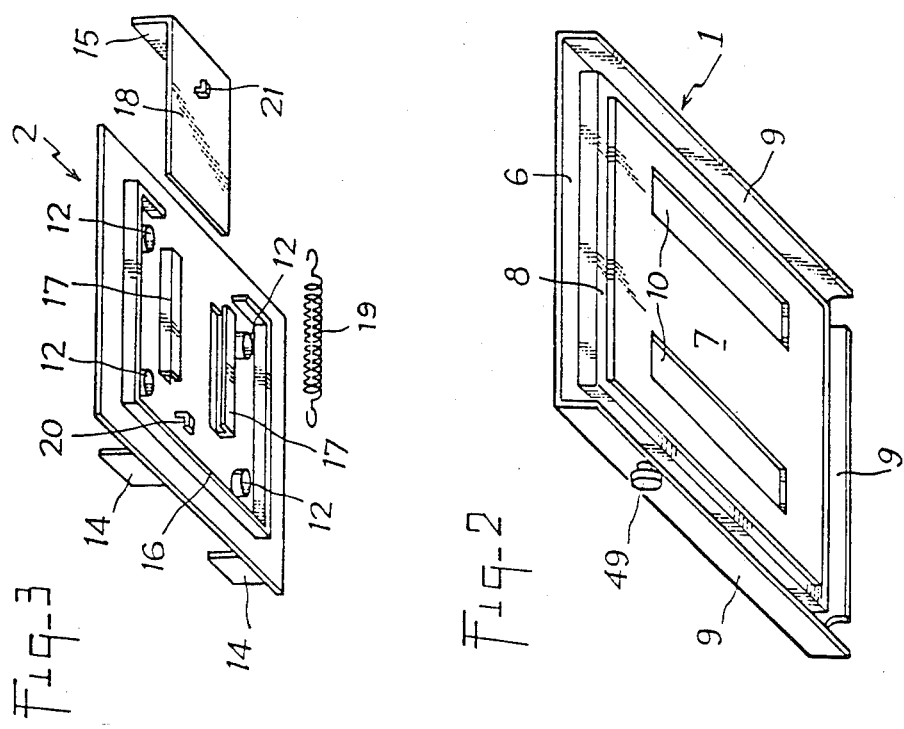

ANTI-VIBRATION MOUNTING DEVICE FOR A COMPACT DISK PLAYER

BACKGROUND OF THE INVENTION

The present invention relates to an anti-vibration device for attaching an article, such as a compact disk player, to a movable vehicle, such as an automobile. In recent years, the audio compact disk player has represented a technological breakthrough in the reproduction of quality sound, and sales of these devices continue to increase. These devices utilize a laser beam to read digitally recorded information on the compact disk to reproduce virtually distortion-free sound.

Initially these devices were sold for home use only, and later, models were introduced which were portable and could be carried around by the user. Compact disk players have also been introduced for use in a movable vehicle, such as an automobile.

However, the virbrations transmitted to the compact disk player through its attachment to the automobile structure has caused the compact disk players to "skip" portions of the data recorded on the compact disk and to otherwise prevent the compact disk player from achieving its full technological benefits.

Although mounting devices are known for attaching record players and audio tape players to an automobile, the unique technology of the compact disk players has rendered these devices unsuitable in isolating the compact disk player from the vibrations or shocks generated by the automobile.

SUMMARY OF THE INVENTION

It is an object of the present invention to provide an anti-vibration device for attaching a compact disk player to an automobile whereby the player is positively retained in place and is not subjected to the shocks and vibrations of the vehicle during its normal operation. Another object of the invention is to make the device simple, economical to manufacture and to be easily installed by the user.

The device according to the invention comprises a generally planar base, means to attach the base to the vehicle, a support plate defining a supporting surface for the compact disk player, means to clamp the compact disk player to the support plate and anti-vibration means to attach the support plate to the base.

The lateral dimensions of the support plate are somewhat less than those of the base to enable the lateral movement of the support plate with respect to the base without contacting the surrounding structure.

The anti-vibration means for attaching the support plate to the base comprises a layer of foam material, which may be a polyurethane foam, and one or more compression coil springs. The use of the foam material serves to dissipate the resonances of the compression spring and provides an effective connection between the support plate and the base. The foam and the coil springs are arranged in such a way that the support plate may move freely with respect to the base.

Clamping means are provided on the support plate to removably clamp the compact disk player to the supporting surface. The clamping means may comprise a plurality of upstanding lugs bearing against at least one side of the compact disk player and a movable lug member attached to the support plate so as to bear against an opposite side of the player. Friction material may be mounted on the surface of the lugs to provide a more positive gripping force.

The base may be mounted directly to the vehicle structure by interengaging hook and loop type fasteners (Velcro) or may be suspended by means comprising a mounting bracket and a plurality of arms. The mounting bracket may be attached directly to the vehicle structure and arms depending therefrom may be attached to the base. The arms may be adjustable so as to vary their length and to enable the angular orientation of the base to be adjusted with respect to the mounting bracket.

BRIEF DESCRIPTION OF THE DRAWINGS

FIG. 1 is a partial, exploded, perspective view of the anti-vibration device according to the invention.

FIG. 2 is a perspective view of the base of the device shown in FIG. 1 showing its underside.

FIG. 3 is an exploded, perspective view of the support plate shown in FIG. 1.

FIG. 4 is a perspective view of one portion of the attaching arms shown in FIG. 1.

FIG. 5 is a perspective view of a second portion of the adjustable arms, shown in FIG. 1.

DETAILED DESCRIPTION OF THE PREFERRED EMBODIMENT

Figure 6:
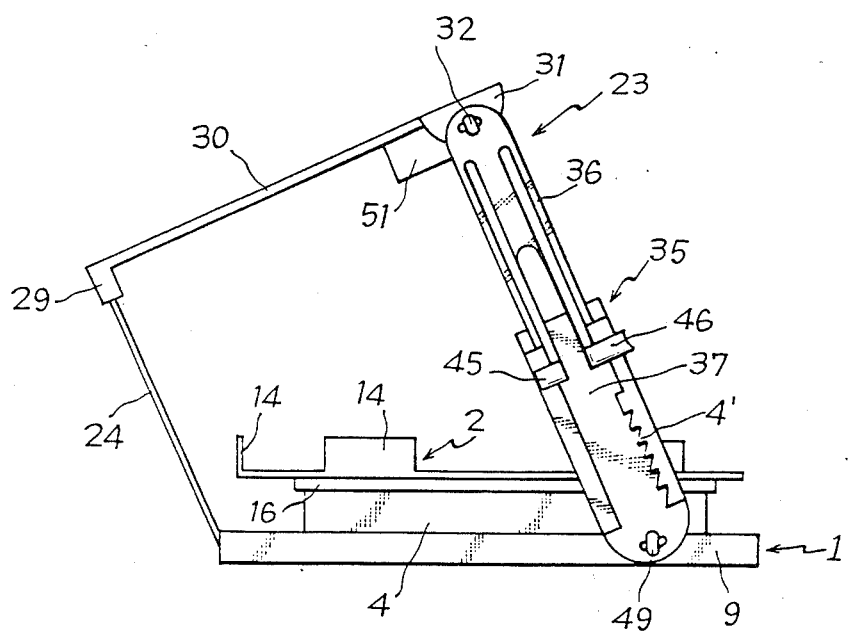
FIG. 6 is a side view of the device according to the invention.

As shown in FIG. 1, the anti-vibration device according to the inventon comprises a base 1, a support plate 2 and anti-vibration means 3 for attaching the support plate 2 to the base 1. The anti-vibration means 3 may comprise a layer of foam material 4 and a plurality of helical compression springs 5.

The base 1 has a generally flat rim 6 enclosing a hollow seat portion with bottom 7 connected to the rim 6 by intermediate shoulder 8. A substantially vertically extending lip 9 extends downwardly from opposite sides and a rear of the base 1 to provide the requisite rigidity.

The underside of bottom 7, as shown in FIG. 2, may define indentations 10 to accommodate one portion of a standard hook and loop (Velcro) type fastener. One portion of this fastener may be mounted in each of the indentations 10 while the corresponding portions may be attached to the automobile structure. The interengagement of these elements may serve to removably attach the base 1 to the automobile.

An upper surface of bottom 7 defines upstanding bosses 11, the number of which is equal to the number of springs 5. Bosses 11 may be solid such that the coils of the springs 5 surround them, or may be hollow such that the coil springs 5 may be inserted therein. In each case, the bosses 11 serve to locate and position the coil springs 5.

The area of foam anti-vibration layer 4 is approximately the same as that of the bottom 7 of base 1 such that the foam layer 4 may be secured to the bottom 7 by known means such as double sided adhesive tape, glue, etc. Foam layer 4 defines a plurality of openings 13 through which coil springs 5 extend. Foam layer 4 may also define a recess 52 to accommodate a movable lug member 15 attached to support plate 2 as will be described in more detail hereinafter.

Support plate 2 defines a substantially planar upper support surface 53 which supports a compact disk player (not shown). The support plate 2 is attached to an upper surface of foam layer 4 by known means.

The compact disk player (not shown) is clamped onto support surface 53 by fixed lugs 14 which extend upwardly substantially perpendicular to support surface 53 from one side and a rear portion of the support plate 2. A movable lug member 15 is movably attached to the support plate 2 such that it may slide in a direction substantially parallel to the support surface 53 in the direction of arrows 54. The movable lug member 15 is attached to attaching portion 18 which, in turn, is slidably received in channel members 17 extending from the bottom of support plate 2, as best seen in FIG. 3. Helical tension spring 19 interconnects bracket 20, formed on support plate 2, and bracket 21, formed on attaching portion 18. This serves to bias the movable lug member 15 towards fixed lug members 14 located on the opposite side of support plate 2. The facing surfaces of lugs 14 and lug member 15 may be covered with a slightly resilient, friction material to increase the clamping force on the compact disk player. Knob 22 is attached to movable lug member 15 to facilitate the manual movement of this member during installation or removal of the compact disk player from the support plate 2.

Typically, support plate 2 is approximately 12.5 cm×12.5 cm and is maintained approximately 1 cm from the rim 6 of base 1 by foam layer 4 and springs 5. Springs 5 perform an essential connecting function between the support plate 2 and the base plate 1 serving to position and elastically support the plate 2. Due to its relative inertia, foam layer 4 prevents any resonant motion of the springs 5 and acts as a vibration damper.

Flange 16 extends downwardly from a lower surface of the support plate 2 and provides the support plate with the necessary rigidity, while at the same time locating it with respect to foam layer 4. The vertical dimension of flange 16 is less than the vertical dimension between the bottom 7 and the rim 6 of base 1 so as to prevent contact between the flange 16 and the rim 6, and allow unrestricted movement between the support plate 2 and base 1.

It has been found that the use of four compression coil springs, each approximately 19 mm long having an inside diameter of approximately 10 mm and formed of 8.25 turns of 6/10 mm steel wire in combination with a polyurethane foam material made by Tramico under the trade name TN2F, provides satisfactory results for known sizes and weights of commercial compact disk players. The springs each have a rating of 100 g at 15 mm; 240 g at 10 mm; and 420 g at 6 mm. The polyurethane foam has a net density of approximately 17 kg/m$^3$ and a gross density of 19 kg/m$^3$. The strength of the polyurethane foam material at the fifth cycle is 23.27 at 25%, 32.36 at 50% and 46.56 at 65%. The material has rupture, elongation and tear strengths of 1200, 200 and 700 g/cm$^2$, respectively. Although these materials have proven to give excellent results, obviously other materials may be substituted therefore without exceeding the scope of this invention.

As noted previously, the base 1 may be attached to the vehicle by a Velcro-type fastener. However, it may also be suspended via the mounting means 23. Mounting means 23 comprises a rear central arm 24 defining a slot 25 at its lower end which elastically snaps over pin 26 formed in a recess 27 at the rear of base 1. The snap connection of slot 25 with pin 26 allows the rear arm 24 to pivot about pin 26 with respect to base 1. The other end of rear arm 24 define latches 28 which snap into a socket 29 formed on "T" shaped bracket 30.

The lateral extremities of the cross member of the "T" shaped bracket 30 define depending flanges 31 each having an oblong knob 32 mounted thereto via cylindrical rod 33. These ends of the "T" shaped bracket are attached to base 1 via arms 35. Although only one such arm is shown in FIG. 1 for the purposes of clarity, it is to be understood that a similar arm is attached to the opposite side of the laterally extending member of "T" bracket 30.

Each of the arms 35 comprise a first portion 36, a second portion 37 and means to interconnect the first and second portions such that the lengths of the arms are adjustable. The first portion 36 of the arms 35 defines an oblong slot 34 adapted to pass over oblong knob 33 so as to pivotally attach first portion 36 to the cylindrical rod 33. Once the arm 35 is in the position shown in FIG. 1, the generally vertically oriented oblong knob 32 is out of alignment with the horizontally oriented oblong slot 34 to prevent inadvertent disengagement of the first portion 36 from the "T" bracket 30. Similarly, second portion 37 defines oblong slot 48 which is adapted to pass over oblong knob 49 attached to base 1 via a cylindrical rod.

The second portion 37 has channels 39 and 40 which slidably engage edges 38 of first portion 36 to enable relative longitudinal movement between portions 36 and 37. Channel member 40 defines serrations 41 and a stop 42 which are engaged by tab 47 formed on resilient member 44 of first arm portion 36. In its normal position, resilient member 44 causes tab 47 to engage one of the serrations 41 to prevent relative movement between the portions 36 and 37. Tab 47 is disengaged from the serrations 41 by pressing element 46 toward element 45 formed on a corresponding member 43 of first portion 36. Once tab 47 is disengaged from the serrations 41, the lengths of arms 35 may be manually adjusted. The thickness of first portion 36 may be different from that of second portion 37 and the oblong knob 32 may be mounted closer to flange 31 than oblong knob 49 is to flange 9. By varying these dimensions, it makes it impossible to improperly assemble second portion 37 to the "T" bracket and the first portion 36 to base 1.

By adjusting the lengths of arms 35, the hinge points between the base 1 and the arms 35, the arms 35 and "T" bracket 30; and arm 24 with base 1 allows the base 1 to be placed at a different angle than the "T" bracket 30, as exhibited in FIG. 6. This enables the bracket 30 to be mounted to virtually any portion of the car and yet maintain the substantially horizontal orientation of the base 1 and the support plate 2. To facilitate the mounting, "T" bracket 30 defines a plurality of holes 50 which allow its attachment by the use of known fasteners. By using the support mount as described, not only is the compact disk player isolated from normal operational vibrations of the vehicle, but the pivoting attachments between the base 1 and the mounting bracket 30 allow dampening of abrupt acceleration or deceleration effects of the vehicle. The relatively small thickness of arm 24 permits this arm to resiliently deflect during abrupt acceleration or deceleration to prevent transmission of forces to the compact disk player.

If necessary, a foam buffer 51 may be attached to the underside of "T" bracket 30 so as to bear against the top of the compact disk player to assist in locking the player onto the support plate 2.

The anit-vibration device according to the invention may be provided in kit form and it is an important feature of the invention that the elements are extremely compact in the disassembled state and may be easily assembled without the necessity of any tools. In a practical embodiment, each of the parts is made of injection molded plastic in a mold having no movable parts.

The foregoing description is provided for illustrative purposes only and should not be construed in any way limiting this invention, the scope of which is defined solely by the appended claims.

What is claimed is:

1. An anti-vibration device for attaching an article to a movable vehicle comprising:
   (a) a generally planar base;
   (b) a support plate defining a supporting surface;
   (c) clamping means mounted on the support plate such that at least a portion of the clamping means extends above the supporting surface for removably clamping the article to the support plate;
   (d) spring means mounted between the base and the support plate;
   (e) a layer of vibration dampening foam material attached to the base and to the support plate to attach the support plate to the base so as to minimize the transmission of vibrations from the base to the support plate; and,
   (f) mounting means to attach the base to the vehicle.

2. The anti-vibration device according to claim 1 wherein the spring means comprises a plurality of compression coil springs.

3. The anti-vibration device according to claim 2 wherein each of the coil springs are approximately 19 mm in length and wherein the ratings of each of the coil springs comprises approximately 100 g at a length of approximately 15 mm; approximately 240 g at a length of approximately 10 mm; and approximately 420 g at a length of approximately 6 mm.

4. The anti-vibration device according to claim 2 wherein the layer of foam material defines a plurality of openings such that a coil spring is disposed in each opening.

5. The anti-vibration device according to claim 1 wherein the vibration dampening foam is a polyurethane material.

6. The anti-vibration device according to claim 5 wherein the polyurethane foam has a net density of approximately 17 kg/m$^3$ and a gross density of approximately 19 kg/m$^3$.

7. The anti-vibration device according to claim 5 wherein the spring means comprises a plurality of compression coil springs.

8. The anti-vibration device according to claim 7 wherein the layer of foam material defines a plurality of openings such that a coil spring is disposed in each opening.

9. The anti-vibration device according to claim 8 wherein the polyurethane foam has a net density of approximately 17 kg/m$^3$ and a gross density of approximately 19 kg/m$^3$.

10. The anti-vibration device according to claim 9 wherein each of the coil springs are approximately 19 mm in length and wherein the ratings of each of the coil springs comprises approximately 100 g at a length of approximately 15 mm; approximately 240 g at a length of approximately 10 mm; and approximately 420 g at a length of approximately 6 mm.

11. The anti-vibration device according to claim 1 wherein the mounting means comprises:
    (a) a bracket adapted to be attached to the vehicle; and,
    (b) a plurality of arms, each arm having a first end attached to the bracket and a second end attached to the base.

12. The anti-vibration device according to claim 11 wherein at least one arm comprises:
    (a) a first portion attached to the bracket;
    (b) a second portion attached to the base; and,
    (c) means connecting the first and second portions such that the length of the arm is adjustable.

13. The anti-vibration device according to claim 12 wherein the connecting means comprises:
    (a) serrations formed on one of the first and second portions; and
    (b) tab means formed on the other of the first and second portions engageable with the serrations so as to enable the adjustment of the length of the arm.

14. The anti-vibration device according to claim 12 further comprising:
    (a) first means to pivotally attach the first portion to the bracket; and,
    (b) second means to pivotally attach the second portion to the base.

15. The anti-vibration device according to claim 11 wherein the plurality of arms comprises:
    (a) first and second arms attached to the bracket and to opposite sides of the base; and
    (b) a third arm attached to the bracket and to a rear of the base.

16. The anti-vibration device according to claim 15 wherein each of the first and second arms comprise:
    (a) a first portion attached to the bracket;
    (b) a second portion attached to the base; and,
    (c) means connecting the first and second portions such that the length of the arm is adjustable.

17. The anti-vibration device according to claim 16 wherein each of the connecting means comprise:
    (a) serrations formed on one of the first and second portions; and
    (b) tab means formed on the other of the first and second portions engageable with the serrations so as to enable the adjustment of the length of the arm.

18. The anti-vibration device according to claim 17 wherein the spring means comprises a plurality of compression coil springs.

19. The anti-vibration device according to claim 18 wherein the layer of foam material defines a plurality of openings such that a coil spring is disposed in each opening.

20. The anti-vibration device according to claim 19 wherein the vibration dampening foam is a polyurethane material.

21. The anti-vibration device according to claim 20 wherein the polyurethane foam has a net density of approximately 17 kg/m$^3$ and a gross density of approximately 19 kg/m$^3$.

22. The anti-vibration device according to claim 21 wherein each of the coil springs are approximately 19 mm in length and wherein the ratings of each of the coil springs comprises approximately 100 g at a length of approximately 15 mm; approximately 240 g at a length of approximately 10 mm; and approximately 420 g at a length of approximately 6 mm.

23. The anti-vibration device according to claim 22 wherein the clamping means comprises:
    (a) at least one fixed lug attached to the support plate extending above and generally perpendicular to the support surface;
    (b) a movable lug member; and, (c) means to movably attach the movable lug member to the support plate such that the article may be clamped between the movable lug member and the at least one fixed lug.

24. The anti-vibration device according to claim 23 further comprising second spring means between the movable lug member and the support plate so as to bias the movable lug member toward the at least one fixed lug.

25. The anti-vibration device according to claim 24 further comprising a friction material attached to the at least one fixed lug and to the movable lug member.

26. The anti-vibration device according to claim 1 wherein the clamping means comprises:

(a) at least one fixed lug attached to the support plate extending above and generally perpendicular to the support surface;
(b) a movable lug member; and,
(c) means to movably attach the movable lug member to the support plate such that the article may be clamped between the movable lug member and the at least one fixed lug.

27. The anti-vibration device according to claim 26 further comprising second spring means between the movable lug member and the support plate so as to bias the movable lug member toward the at least one fixed lug.

28. The anti-vibration device according to claim 27 further comprising a friction material attached to the at least one fixed lug and to the movable lug member.

* * * * *